United States Patent [19]

Henkel et al.

[11] Patent Number: 4,795,769

[45] Date of Patent: Jan. 3, 1989

[54] ELECTRIC INSULATION WITH A SILICIC ACID ADDITIVE MADE BY A MELT PROCESS

[75] Inventors: Hans-Joachim Henkel, Erlangen; Norbert Müller, Herzogenaurach, both of Fed. Rep. of Germany

[73] Assignee: Siemens Aktiengesellschaft, Berlin & Munich, Fed. Rep. of Germany

[21] Appl. No.: 76,053

[22] Filed: Jul. 21, 1987

[30] Foreign Application Priority Data

Aug. 4, 1986 [DE] Fed. Rep. of Germany ....... 3626408

[51] Int. Cl.$^4$ ........................... C08K 3/34; H01B 7/00; H01B 3/42; H01B 3/44
[52] U.S. Cl. ..................................... 523/219; 523/218; 524/493; 524/494; 174/110 SR; 174/110 PM
[58] Field of Search ................ 523/218, 219; 524/493, 524/494

[56] References Cited

U.S. PATENT DOCUMENTS

| | | | |
|---|---|---|---|
| 3,915,922 | 10/1975 | Suzuki et al. | 524/493 |
| 4,132,700 | 1/1979 | Stephens et al. | 523/216 |
| 4,244,860 | 1/1981 | Kuhnel et al. | 524/263 |
| 4,458,044 | 7/1984 | Henkel | 524/100 |
| 4,507,387 | 3/1985 | Gajewski et al. | 524/567 |
| 4,574,111 | 3/1986 | Henkel et al. | 524/381 |
| 4,581,290 | 4/1986 | Henkel et al. | 524/580 |
| 4,623,755 | 11/1986 | Henkel et al. | 524/586 |

FOREIGN PATENT DOCUMENTS

| | | |
|---|---|---|
| 0127054 | 10/1985 | European Pat. Off. . |
| 0127052 | 4/1986 | European Pat. Off. . |
| 3323844 | 1/1985 | Fed. Rep. of Germany . |
| 3503998 | 8/1986 | Fed. Rep. of Germany . |
| 3516971 | 11/1986 | Fed. Rep. of Germany . |

*Primary Examiner*—Herbert J. Lilling
*Attorney, Agent, or Firm*—Kenyon & Kenyon

[57] ABSTRACT

The invention relates to electric insulation with a polyolefin base for medium and high voltage from about 10 kV up. In insulation of this type the formation of so-called water trees is to be prevented on the one hand and on the other hand, the dielectric losses are to be kept as low as possible. For this purpose it is provided that silicic acid prepared in the following manner is added to the insulation: $SiO_2$-containing mineral substances are melted with additions of aluminum oxide, boron oxide and carbonates and/or oxides of alkali and earth-alkali metals to form a homogeneous glass phase; from the glass melt, glass bodies with a large surface are made; the glass bodies are subjected to a leaching process with mineral acid; the porous $SiO_2$ bodies produced are washed and dried and optionally milled. The electric insulation according to the invention is particularly well suited for use in cables and wires.

9 Claims, No Drawings

ELECTRIC INSULATION WITH A SILICIC ACID ADDITIVE MADE BY A MELT PROCESS

BACKGROUND OF THE INVENTION

The invention relates to electric insulation for use especially in cables and wires for medium and high voltage from about a minimum of 10kV. The insulation is based upon polyolefin with an additive of 0.05 to 10% by weight (with a particle size of up to 50 μm or an agglomerate size of up to 100 μm) which retards formation of water trees.

In electrically stressed pololefin insulation, processes can occur which are called "electrochemical treeing" (ECT) or "water treeing". These processes, which are serious problems particularly in respect to the operating safety of plastic-insulated medium and high-voltage cables lead to the formation of tree-like structures, the so-called ECT structures.

The optical appearance of ECT structures which are visible with particularly high contrast and detail after suitable dyeing is manifold. Fundamentally, two forms can be distinguished:

"vented trees" which start from the surface of the insulation and extend into the insulation, and "bow-tie trees" which are generated in the interior of the insulation.

The mechanism of the ECT formation has not been clarified to date. It is generally assumed, however, that an electric field and the presence of a polar liquid, especially water, are required for the formation of the ECT structures; the ECT structures are therefore also called water trees. The initiation points of the water trees always seem to be faults such as impurities, aggregate admixtures, voids, gaps, cracks or boundary surfaces, of which, however, only a part leads to the formation of water trees. The faults cannot be avoided completely in the case of insulation produced in a large technical scale. From these faults, the tree-like structures extend in the direction of the electric field.

Since ECT structures represent local changes of the insulating material, they can cause damage to the insulation especially with respect to the dielectric strength. Numerous attempts have therefore already been undertaken to prevent or at least retard the growth of water trees. In particular, additives to the insulation layer have been made.

Suitable additives with which the ECT formation can be prevented effectively and permanently are in particular:

barbituric acid and 2-thiobarbituric acid as well as derivatives thereof (DE-OS No. 32 02 828 or U.S. Pat. No. 4,458,044, water-soluble alkali and earth-alkali phosphates as well as hydrolyzable phosphoric-acid esters (DE-OS No. 32 02 896 or U.S. Pat. No. 4,581,290, substances with a certain particle or agglomerate size which are adsorption-active for heavy-metal ions or bind them in an ion exchange (DE-OS No. 33 18 988 or U.S. Pat. No. 4,623,755), alcoholates of magnesium, calcium and aluminum (DE-OS No. 33 21 268 or U.S. Pat. No. 4,574,111), potassium and sodium stannate as well as titanium oxysulfate (DE-OS No. 35 03 998), and derivatives of pyrimidine and hexahydropyrimidine (DE-OS No. 35 16 971).

From DE-OS No. 33 18 988 or U.S. Pat. No. 4,623,755, cited above, it is known to use in a polyolefin base electric insulation as an additive for retarding water trees, a homogeneous distribution of 0.05 to 10% by weight of a substance which is adsorption-active for heavy metal ions or binds heavy metal ions in an ion exchange, the substance having a particle size of up to 50 μm or an agglomerate size of up to 100 μm. As additives can be used here aluminum oxide and oxide hydrates with a large active surface and/or aluminum silicates; preferably, however, the electric insulation contains pyrogenic and/or precipitated silicic acid. The additives are preferably synthetic products; however, minerals found in nature can also be used.

Although additives of the above-mentioned type have been found to be effective for retarding water trees, electric insulation, particularly cable and wire insulation, must exhibit a number of further important properties for practical employment. Among them are particularly thermally-oxidative stability, sufficient mechanical strength, low dielectric losses, optical transparency and storage stability as a processable insulating compound. Special attention must be given to the dielectric losses because they can be increased if additives are present in the insulation.

It is an object of the invention to further develop electric insulation of the type mentioned at the outset in such a manner that it meets the requirements of practice in every respect, ECT-retarding effectiveness and low dielectric losses being sought in particular.

SUMMARY OF THE INVENTION

These and other objects are achieved according to the invention, by an electrical insulation composed of a polyolefin base and a silicic acid additive which prevents or retards water-treeing, wherein the silicic acid is prepared in the following manner:

(a) melting mineral substances containing $SiO_2$ with additives of aluminum oxide, boron oxide and carbonates and/or oxides of alkali and earth alkali metals to form a homogeneous glass phase, (b) preparing from the glass melt particulate glass bodies with a large surface area, i.e., finely divided particulate, (c) leaching the glass bodies with mineral acid, and (d) washing and drying as well as optionally milling the porous $SiO_2$ bodies formed.

DETAILED DESCRIPTION OF THE INVENTION

Silicic acid (chemical composition: $SiO_2$) prepared in the foregoing manner is characterized by the feature that it is not crystalline but amorphous to X-rays. In addition, it is highly purified. This silicic acid is used in the electric insulation according to the invention as an extremely small (micro) size of particulate i.e., finely powdered form which is obtained if required by milling coarser-grained $SiO_2$ bodies.

Silicic acid of the above-mentioned kind is known per se (DE-OS No. 33 23 844). It serves as a filler for plastics which are used for enclosing or covering integrated semiconductor circuits. For this purpose, however, it is essential that the filler, i.e., the silicic acid exhibits a low alpha particle radiation activity. To this end, it is necessary to use a silicic acid which is free of impurities, in particular such as the elements thorium and uranium which are responsible for the alpha emission.

It was therefore surprising and could also not be foreseen that electric insulation with such silicic acid as an additive such as the electric insulation according to the invention represents, but only has excellent ECT-retarding effectiveness but also low dielectric losses. Such electric insulation is therefore particularly well suited for practical employment.

The silicic acid used in the electric insulation according to the invention is prepared from SiO2 containing mineral starting materials; this purpose is served particularly by quartz sand. The starting material is converted here, together with the additives, into a homogeneous glass phase by melting (temperature: about 1100° to 1500° C.), where the SiO2 content in the glass melt is preferably adjusted to a value between 50 and 70% by weight. As additives are used, besides aluminum oxide and boron oxide, preferably the oxides or carbonates of sodium, potassium, magnesium and/or calcium. From the glass melt, particulate glass bodies having in a composite sense a large surface area, i.e., finely divided, are then prepared. This can either be done in such a manner that from the glass melt, glass fibers with uniform diameter of less than 100 microns are drawn or that the solidified glass melt is comminuted and milled to form grains of defined grain size. The glass bodies are subsequently subjected to a leaching process in mineral acid, for which purpose preferably hydrochloric acid heated to at least 95° C. serves (3 n to 6 n; duration: 4 to 96 hours). In the process, the impurities and the additives are dissolved from the glass matrix, whereby an amorphous and high-purity particulate silicic acid (SiO2) is produced. This silicic acid is then washed until free of acid and is dried (temperature: about 150° C.) and if required, is finally milled so that it has the desired particle size.

As already explained, the silicic acid content in the electric insulation is about 0.05 to 10% by weight, according to the invention, relative to the total weight (of the insulation), and the particle size of the silicic acid is up to 50 microns. Advantageously, the silicic acid content is 0.1 to 4% by weight and preferably 0.5 to 2% by weight. The particle size of the silicic acid is preferably up to 20 microns. The silicic acid is added to the insulating material. In cables and wires, the silicic acid can be added, besides the insulting layer proper, also the field-limiting layers, i.e., to the inner and/or outer semiconducting layers.

In addition to cables and wires, the electric insulation according to the invention can also be used in bushings and fittings.

In the insulating composition of the invention, polyolefins serve as the base, in cross-linked or noncross-linked form. Polyethylene (PE) and cross-linked polyethylene (VPE) are used in particular in the insulation according to the invention. In addition, however, also ethylene copolymers such as ethylene-propylene copolymers (EPR), ethylene-vinylacetate copolymers (EVA) and ethylene-alkylacrylate copolymers (for instance, ethylene-ethylacrylate and butyacrylate copolymers), or ethylene-propylene-diene terpolymers and mixtures (blends) of these ethylene copolymers and terpolymers with polyolefins, especially polyethylene and polypropylene, can be used. As already mentioned, the foregoing polymers or polymer mixtures can be used cross-linked as well as noncross-linked. The cross-linking takes place preferably peroxidically or by high-energy radiation. To the insulating compositions can also be added customary additives such as oxidation stabilizers.

In the electric insulation according to the invention, the polyolefin is preferably polyethylene or an ethylene copolymer with a polar comonomer or a polymer blend of polyethylene and the ethylene copolymer, the content of the polar comonomer in the copolymer or polymer blend being 1 to 5% by weight; see in this connection the U.S. patent application entitled "Electric Insulation with a Silicic Acid Additive" which has as inventors Drs. Peter Fischer, Hans-Joachim Henkel and Norbert Müller and is based upon priority German application No. P 3626409.1, the disclosure of which is incorporated herein by reference. The polar comonomer of the ethylene copolymer is here preferably an alkylacrylate, especially butylacrylate, i.e., an ethylene-butylacrylate copolymer (EBA) serves as the copolymer. In addition, however, methyl- and ethylacrylate can also be considered as well as vinyl acetate, vinyl alcohol, acrylonitrile and alkyl maleinate as further polar comonomers.

The invention will be explained in greater detail with the aid of the following example.

EXAMPLE

Plates 3 mm thick were prepared of low-density, high-purity polyethylene (LDPE) which contained 4.4'-thiobis(6-tert-butyl-3-methyl phenol) as an oxidation stabilizer and dicumyl peroxide as a cross-linking agent. The preparation took place by extruding part of the foregoing polymer composition under pressure and at elevated temperature together with pyrogenic silicic acid with a large specific surface (for instance, about 300 m2/g) which is commercially available under the name Aerosil ®, whereby the cross-linking of the insulating material took place. Into the other part of the foregoing polymer composition was mixed a silicic acid prepared according to DE-OS 33 23 844, by the so-called leaching method, in a concentration of 1% by weight. The plate-shaped test pieces were then stressed electrically with 10 kV/50 Hz, both surfaces being in direct contact with a 3-% sodium chloride solution heated to 70° C. The duration of the stress was 130 hours.

The test results show, first, that none of the plate-shaped test pieces exhibited ECT structures after the electrical stress, i.e., those which correspond to the electric insulation according to the invention as well as those corresponding to the electric insulating according to DE-OS No. 33 18 988. As already explained, it is also important for electrical reasons, besides the ECT retardation, that the electric losses and thereby also tan δ are as low as possible.

The test performed showed in detail the following:

| Insulating Material | ECT Structures | tanδ |
|---|---|---|
| 100% LDPE + 1% Aerosil ® | None | $28 \times 10^{-4}$ |
| 100% LDPE + 1% silicic acid as per DE-OS 33 23 844) | None | $10 \times 10^{-4}$ |

While it is found that the tan δ-values of all test pieces are below the value $40 \times 10^{-4}$ which is specified in IEC Publication No. 502 (1978 Edition) and thereby meet the standard requirements, an insulating material with a silicic acid prepared from mineral starting materials by the leaching method is to be preferred over other types of silicic acid such as pyrogenic silicic acid because it has the lower dielectric losses.

Generally it is therefore found that the electric insulation according to the invention which contains silicic acid prepared by the leaching method has low dielectric losses as well as suppresses the ECT formation effectively and permanently.

What is claimed is:

1. An electric insulation which is suitable for use with cables and wires carrying medium and high voltage from about 10 kV, and which is formed of a polyolefin base and an additive of 0.05 to 10% by weight silicic acid having a particle size of up to 50 microns or an agglomerate size of up to 100 microns for retarding water trees, wherein the silicic acid is prepared by a process comprising:
   (a) melting mineral substances containing $SiO_2$ with additives of aluminum oxide, boron oxide or carbonates and/or oxides of alkali and earth alkali metals, to form a homogenous glass melt,
   (b) preparing particulate glass bodies from the glass melt, the glass bodies being finely divided and as a composite having a large surface area,
   (c) leaching the glass bodies with mineral acid, and
   (d) washing and drying the porous $SiO_2$ bodies formed.

2. An electrical insulation according to claim 1 wherein the washed and dried glass bodies are milled.

3. Electric insulation according to claim 1 wherein the silicic acid has a particle size of up to 20 microns.

4. An electric insulation according to claim 1 or 3 wherein the silicic acid content is 0.1 to 4% by weight.

5. An electrical insulation according to claim 4 wherein the silicic acid content is 0.5 to 2% by weight.

6. An electric insulation according to claim 1 or 3 wherein the polyolefin is polyethylene.

7. An electric insulation according to claim 1 or 3 wherein the polyolefin is an ethylene copolymer with a polar co-monomer or a polymer blend of polyethylene and the ethylene copolymer, the content of the polar co-monomer in the copolymer or in the polymer blend being 1 to 5% by weight.

8. An electric insulation according to claim 7, wherein the polar co-monomer of the ethylene copolymer is an alkylacrylate.

9. An electrical insulation according to claim 8 wherein the co-monomer is butylacrylate.

* * * * *